United States Patent [19]

Andrews

[11] Patent Number: 4,728,871

[45] Date of Patent: Mar. 1, 1988

[54] NOVELTY ELECTRIC MOTOR

[76] Inventor: Roger W. Andrews, 3110 Portland St., Eugene, Oreg. 97405

[21] Appl. No.: 794,294

[22] Filed: Nov. 1, 1985

[51] Int. Cl.4 ............................................. H02K 33/00
[52] U.S. Cl. ..................................... 318/130; 446/484
[58] Field of Search ........................... 446/484; 320/1; 318/128, 130

[56] References Cited

U.S. PATENT DOCUMENTS

| | | | |
|---|---|---|---|
| 2,831,114 | 4/1958 | Overbeek | 318/130 X |
| 3,040,225 | 6/1962 | Reich | 318/128 X |
| 3,100,278 | 8/1963 | Reich | 318/128 |
| 3,118,098 | 1/1964 | Reich | 318/128 |
| 3,403,312 | 9/1968 | Sparing | 318/130 |
| 3,424,960 | 1/1969 | Ross | 318/130 X |
| 3,457,483 | 7/1969 | Reifman et al. | 318/128 |
| 3,474,314 | 10/1969 | Ito | 318/128 |
| 3,491,280 | 1/1970 | Risse | 318/130 X |
| 3,783,550 | 4/1972 | Andrews | 446/484 |
| 3,807,163 | 4/1974 | Meitinger | 318/132 X |

Primary Examiner—Benjamin Dobeck
Attorney, Agent, or Firm—Olson and Olson

[57] ABSTRACT

A permanent magnet armature is arranged to be moved initially in spaced proximity to an induction coil connected in an electric circuit across the series arrangement of a source of electric potential and an electronic switch such that when the moving magnetic field of the magnet cuts the coil turns the resulting induced current operates the switch momentarily to connect the source of electric potential across the coil. The resulting current flow through the coil produces a magnetic field which is imposed upon the moving magnet such as to accelerate its movement. An RC time constant circuit is connected across the coil to establish the time period of battery connection across the coil. In one embodiment, the magnet armature is a permanent magnet mounted at the bottom end of a pendulum arm supported at its upper end for oscillation with two degrees of freedom in a random manner produced by arranging an odd number of three or more permanent magnets symmetrically about the vertical axis of the coil and poled to repel the pendulum magnet.

30 Claims, 17 Drawing Figures

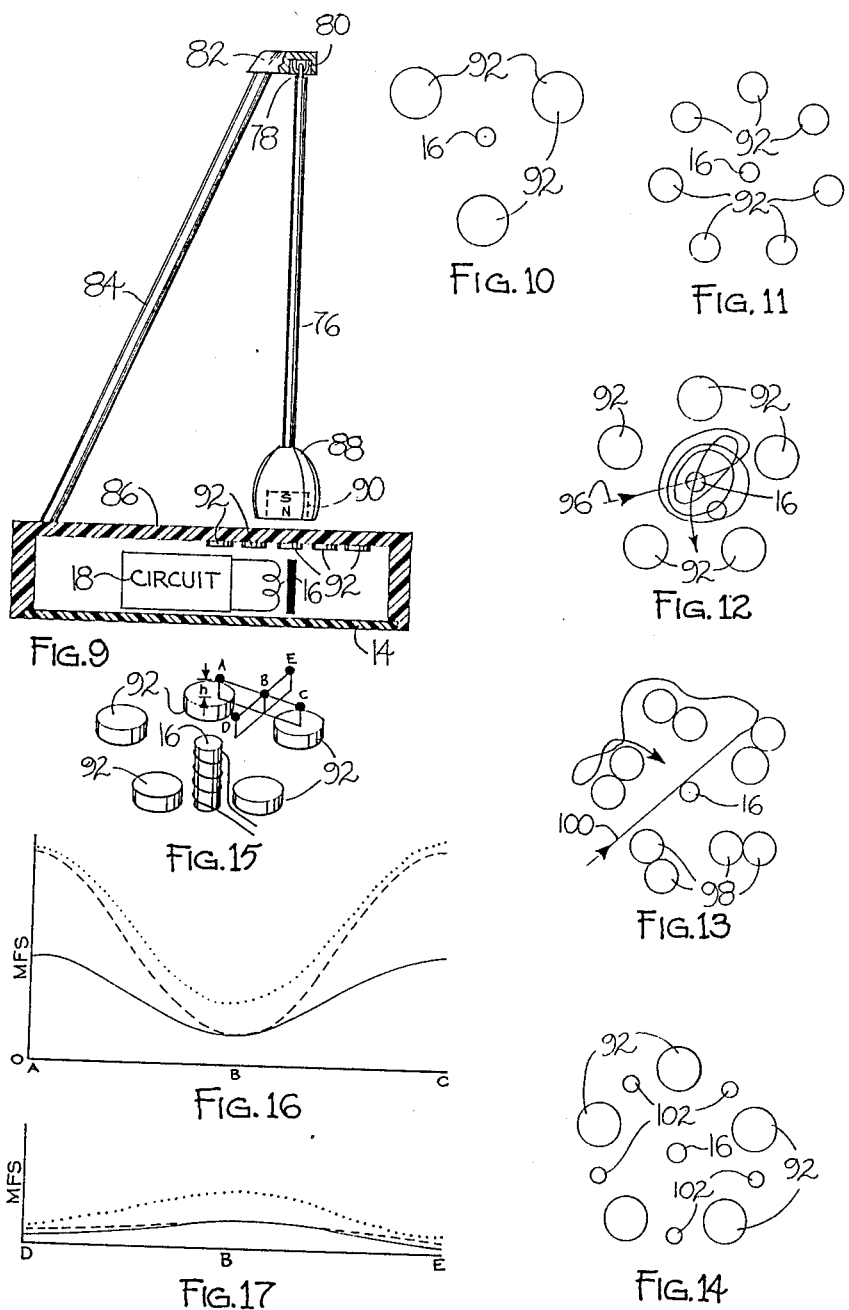

4,728,871

1

NOVELTY ELECTRIC MOTOR

BACKGROUND OF THE INVENTION

This invention relates to electric motors, and more particularly to a novel electric motor which appears to have no source of power.

This invention provides an electric motor circuit and a variety of forms of novelty electric motors which represent improvements over the electric motors and circuits disclosed in my prior U.S. Pat. No. 3,783,550. The new electric motor circuit provides several advantages: (1) It is more sensitive to magnetically induced voltage. (2) It provides easier and more precise tailoring of pulse width, i.e. the duration of time during which the battery is connected to the coil, to the requirements of specific structural systems. In this regard, the pulse width is independent of transistor gain and coil inductance, and is determined by choosing the desired RC time constant. Moreover, the pulse width is inversely proportional to the battery voltage. (3) It compensates for low battery voltage by increasing the pulse width. For example, in some applications, battery voltage may be varied from 18 volts down to 5 volts with no significant change in armature operation.

SUMMARY OF THE INVENTION

The electric circuit of this invention includes an inductance coil connected intermittently across a battery by activation of a transistor switch, and an RC circuit also is connected across the coil to control the time during which the battery is connected across the coil.

It is the principle objective of this invention to provide a novelty electric motor circuit which is significantly more sensitive to the magnetically induced voltage than the circuits of my earlier U.S. Pat. No. 3,783,550 and accordingly increases battery life by several magnitudes, in some applications.

Another object of this invention is the provision of a novelty electric motor circuit of the class described in which the RC time constant is adjustable, whereby to control the speed of operation of the armature of the novelty electric motor.

Still another object of this invention is to provide a novelty electric motor circuit of the class described wherein the armature may take the form of an axially rotatable member.

A further object of this invention is the provision of a novelty electric motor circuit of the class described wherein the inductance coil may be devoid of a core and the armature provided in the form of a longitudinally reciprocative member.

A still further object of this invention is the provision of a novelty electric motor circuit of the class described wherein the armature may take the form of a pendulum which is movable randomly with two degrees of freedom.

The foregoing and other objects and advantages of this invention will appear from the following detailed description, taken in connection with the accompanying drawings of preferred embodiments.

BRIEF DESCRIPTION OF THE DRAWINGS

FIG. 9 is a vertical section of a fourth form of novelty electric motor embodying the features of this invention, the same being in the form of a randomly oscillating pendulum.

FIG. 10 is a plan view of an arrangement of three permanent magnets for perturbing the motion of the pendulum of FIG. 9.

FIG. 11 is a plan view of an arrangement of seven permanent magnets for perturbing the motion of the pendulum of FIG. 9.

FIG. 12 is a plan view of an arrangement of five permanent perturbing magnets with a sixth "anti-spiral" magnet for preventing spiraling of the pendulum around the vertical axis of the coil.

FIG. 13 is a plan view of an arrangement of five pairs of permanent perturbing magnets.

FIG. 14 is a plan view of an arrangement of five permanent repelling magnets and five permanent attracting magnets.

FIG. 15 is a perspective schematic view of five permanent perturbing magnets with associated line segments representing magnetic field strengths.

FIG. 16 is a graph of magnetic field strengths along line segment ABC in FIG. 15.

FIG. 17 is a graph of magnetic field strengths along line segment DBE in FIG. 15.

DESCRIPTION OF THE PREFERRED EMBODIMENTS

Figure 1:
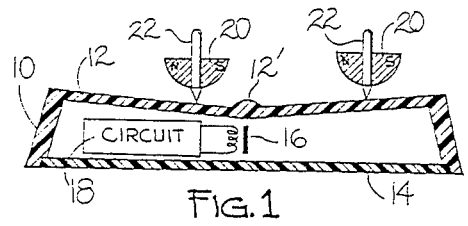
FIG. 1 is a vertical section of a novelty electric motor embodying the features of this invention, the same being in the form of a spinning top armature.

FIG. 1 illustrates a novelty electric motor structure similar to one illustrated in my previous U.S. Pat. No. 3,783,550. Thus, the novelty electric motor is in the form of an amusing and interesting spinning top toy or conversation piece. It includes a housing of non-magnetic material, such as wood or synthetic thermoplastic or thermosetting resin. The housing is hollow and includes a peripheral wall 10 and a dished top base 12 the outer surface of which preferably is concave inwardly toward a slightly convex central portion 12'. The bottom, open side of the housing is removably closed by a bottom wall 14.

Within the hollow housing there is mounted an induction coil 16, preferably of the iron core, electromagnet type. The opposite ends of the coil are connected to an electric circuit 18, preferably of the type illustrated in FIG. 2 and described in detail hereinafter.

As illustrated, the spinning top has a hemispherical body 20 and a central shaft 22 disposed on the rotational axis of the body. The body contains one or more magnets with the poles thereof disposed in a plane extending perpendicular to the rotational axis.

Additional amusement may be achieved by putting two or more of the spinning tops in spinning motion on the dished base, as illustrated in FIG. 1. As the tops skitter about randomly over the base, they bump into one another on random occasions and under conditions such that one of the tops may be toppled over, or may even be ejected from the base. Thus, this mode of operation provides the basis for an amusing game of chance.

Figure 2:
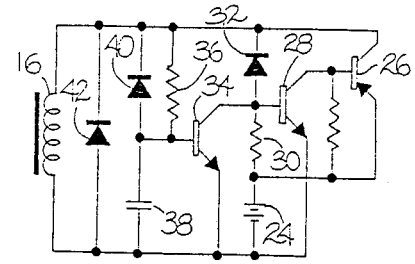
FIG. 2 is a schematic diagram of an electric circuit for the novelty electric motor of FIG. 1.

Referring now to FIG. 2 of the drawings, there is connected across the coil 16 the series circuit of a battery source of electric potential 24 and the emitter-collector circuit of transistor 26. The base-emitter circuit of this transistor is connected in series with the emitter-collector circuit of transistor 28 across the battery 24. The base-emitter circuit of transistor 28 is connected in series with resistor 30 across the battery 24. Biasing diode 32 biases the base-emitter junction of transistor 28 to a point close to turning on.

Also connected across the battery 24 is the series arrangement of resistor 30 and the emitter-collector circuit of transistor 34. The base-emitter circuit of transistor 34 is connected in series with resistor 36 across the coil 16. This resistor and capacitor 38 are connected in series across the coil 16 and form an RC time constant circuit which determines the duration of time for which the battery is connected across the coil.

Also connected in series with the capacitor 38 across the coil 16 is diode 40, forming a current loop. A second current loop is formed by the coil 16 and the diode 42 connected across it.

In the operation of the circuit of FIG. 2, let it be assumed that the circuit is in the "off" state by virtue of no top 20 being put into spinning rotation on the base 12. In this condition the only significant current flow is through resistor 30, diode 32 and coil 16. This current is of the order of about 1 microampere, and thus has little effect on the life of the battery. As previously indicated, the voltage drop across the biasing diode 32 biases the base-emitter junction of transistor 28 to the point close to turning it on.

Let it now be assumed that a spinning top magnet 20 has been put into spinning motion on the base 12. The base-emitter junction of transistor 28 now has enough voltage across it to allow some current to flow through it. An amplified current thus flows through its collector and the base-emitter junction of transistor 26. This transistor also amplifies its base-emitter junction current by allowing a current of greater magnitude to flow out of its collector.

With transistor 26 in saturation, the voltage across the coil 16 is nearly the same as the battery voltage. This results in an increasing current flow through the coil and an increasing magnetic field in and about the coil. Diode 32 is now reverse biased, causing all of the current flowing through resistor 30 to flow through the base-emitter junction of transistor 28. The capacitor 38 now begins to charge through resistor 36, and this "on" state remains stable until the capacitor acquires a sufficient voltage to turn on transistor 34.

When capacitor 38 is sufficiently charged to allow a small current to flow in the base-emitter junction of transistor 34, amplified collector current flowing in the transistor causes a decrease in the base-emitter current of transistor 28. The charging of capacitor 38 along with the decreasing base-emitter current of transistor 28 continues until the collector current of transistor 28 is no longer sufficient to keep transistor 26 in saturation. Accordingly, the current flowing in the coil 16 begins to decrease, resulting in a rapid voltage drop across the coil and at the cathodes of the diodes 32, 40 and 42.

The voltage at the cathode of diode 42 passes through the zero point with respects to its anode. It is at this time that biasing diode 32 begins to conduct, whereupon the current through the base-emitter of transistor 28 drops to zero. At the same time a current loop forms through the coil 16, capacitor 38 and diode 40, rapidly discharging the capacitor. Diode 42 begins conducting current at about the time that the capacitor has completely discharged. The capacitor may charge slightly in the opposite direction. In any event, the current loop through the coil 16, capacitor 38 and diode 40 comes to an end.

The current loop flowing through the coil 16 and diode 42 continues to provide power to the magnet top 20 that originally induced the voltage into the coil 16. This current loop exists without drawing current from the battery 24, and therefore is considered to be "coasting", i.e. power is coming from the collapsing magnetic field in and about the coil. In some cases, such as with the pendulum configuration illustrated in FIG. 9, more energy is transferred to the magnet during this state than is transferred during the "on" state, because the "coasting" state may last several times longer than the "on" state.

After the current loop through the coil 16 and diode 42 dies out, the circuit will be in the "off" state. If the moving magnet top 20 is still inducing voltage into the coil with the correct polarity, then the "off" state will be only a transition state to the "on" state. In the case of the pendulum configuration of FIG. 9, the circuit changes from the "on" state to the "coasting" state and back to the "on" state from ten to thirty times each time the pendulum magnet passes across the coil.

Figure 3:
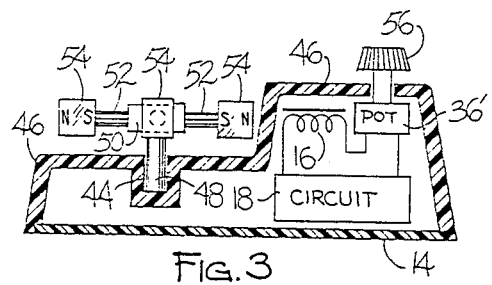
FIG. 3 is a vertical section of a second form of novelty electric motor embodying the features of this invention, the same being in the form of a rotary wheel armature.

Referring now to FIG. 3 of the drawings, the novelty electric motor is illustrated in the form of a rotary wheel armature. Thus, a bearing socket 44 in the top 46 of the housing receives freely rotatable therein a vertical shaft 48. The upper end of the shaft mounts a hub 50 from which a plurality of radiating spokes 52 each mounts at it's outer end a permanent magnet 54.

Figure 4:
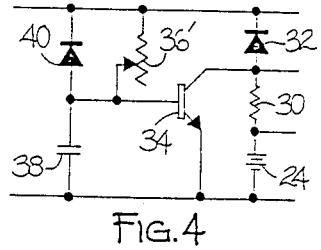
FIG. 4 is a schematic diagram of an electric circuit for the novelty electric motor of FIG. 3.

A vertically extending portion of the top of the housing is positioned closely adjacent the rotational position of the magnets 54 and separates the latter from the inductance coil 16. As in FIG. 1, the coil 16 is connected to the electric circuit 18. As indicated in FIG. 4, this electric circuit 18 preferably is modified to the extent of replacing the RC time constant resistor 36 of FIG. 2 with a variable resistor 36', illustrated in the form of a potentiometer. The control knob 56 of the potentiometer serves to provide control of the rotational speed of the armature wheel by varying the RC time constant and hence the pulse width, or the time during which the coil is connected across the battery. The high sensitivity of the electric circuit also allows it to continue to trigger while in the low power, low rpm setting.

Figure 5:
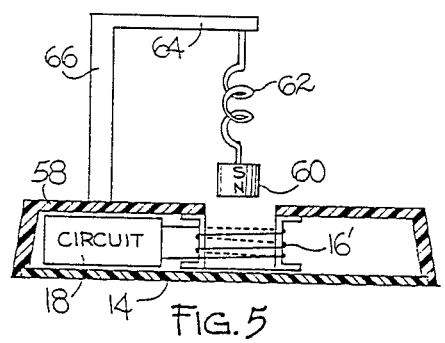
FIG. 5 is a vertical section of a third form of novelty electric motor embodying the features of this invention, the same being in the form of a vertically reciprocative armature.

The embodiment of FIG. 5 utilizes an inductance coil that is devoid of an iron or other type of core. Thus, the top base 58 of the housing is provided with a central opening registering with the hollow core of coil 16'. A magnet armature 60 is suspended above and in axial alignment with the hollow core by means of a resiliently extensible member such as a length of rubber or the coil spring 62 illustrated. The upper end of the coil spring is secured to the arm 64 extending laterally from upstanding post 66 secured to the base 58.

Figure 6:
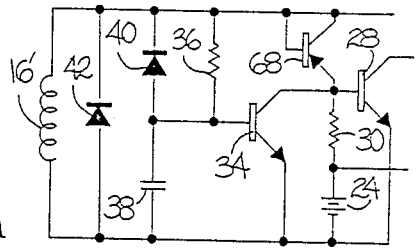
FIG. 6 is a schematic diagram of an electric circuit for the novelty electric motor of FIG. 5.

The coil 16' is connected to the circuit 18 illustrated in FIG. 2, preferably modified to the extent illustrated in FIG. 6. This modification involves the replacement of the biasing diode 32 with transistor 68. The voltage drop across this transistor biases the base-emitter junction of transistor 28 to the point where it actually turns "on" slightly. Assuming that transistors 28 and 68 are exactly matched, then current flow into the collector of transistor 28 is exactly the same as the current flow out of the collector of transistor 68, since both transistors have the same voltage across their base-emitter junctions. During the "on" state, the base-emitter junction of transistor 68 is reversed biased. Accordingly the transistor must be of a type that can withstand a back voltage across this junction in excess of the battery voltage.

In operation of the structure of FIG. 5, the magnet 60 hangs straight down due to the force of gravity and is free to oscillate in a vertical motion. The magnet passes through the coil 16' as it oscillates. However, it will be understood that the magnet need not pass through the coil, but rather may be arranged to oscillate above the coil or below it.

Figure 7:
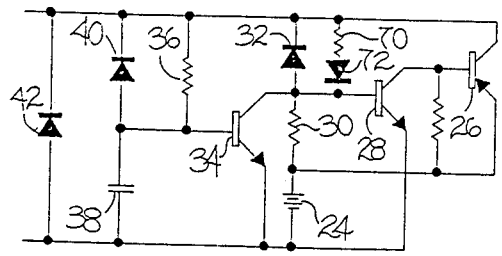
FIG. 7 is a schematic diagram of an electric circuit in which increased current to the coil is provided by positive feedback.

In FIG. 7, the circuit of FIG. 2 is modified by inserting the resistor 70 and diode 72 in series with the emitter-collector circuit of transistor 26 and the base-emitter circuit of transistor 28, to allow some of the collector current from transistor 26 to flow down through the base-emitter junction of transistor 28. This allows an amplified current to flow through the collector of transistor 28 and the base-emitter junction of transistor 26. The latter transistor also amplifies its base-emitter junction current by allowing a current of greater magnitude to flow out of its collector.

For example, let it be assumed that transistors 26 and 28 each have a current gain of 100. Accordingly, the current flowing out of the collector of transistor 26 is 10,000 times the current flowing into the base of transistor 28. Let it be assumed also that the bias current in resistor 30 is one microampere. Let it further be assumed that resistor 70 will pass 1 milliampere of current. Under these conditions the collector of transistor 26 can now deliver 10,000 times one milliampere, or ten amperes of current to the coil 16. In contrast, with resistor 70 and diode 72 omitted, the collector of transistor 26 can deliver 10,000 times 1 microampere, or 10 milliamperes to the coil 16.

The modified circuit of FIG. 7 is employed advantageously in the spinning top game described in my earlier U.S. Pat. No. 4,200,283 since the additional sensitivity allows the spinning tops to receive power at a greater distance or a slower rpm. Since the game uses a fairly high amount of power in order to have interesting animation, it is desirable to use size "C" or "D" cell batteries rather than the more expensive standard 9 volt transistor radio battery. In such instance the game is operated at 1.5 or 3.0 volts.

Figure 8:
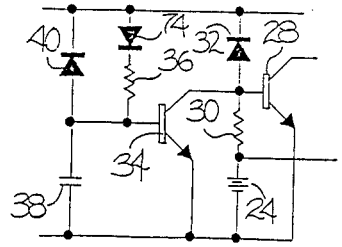
FIG. 8 is a schematic diagram of an electric circuit in which a diode in series in the RC circuit serves to prevent increase in pulse width.

In FIG. 8, the circuit of FIG. 2 is modified by connecting the diode 74 in series with the time constant resistor 36. This diode prevents the capacitor 38 from acquiring a charge from the current loop that otherwise would flow through the coil 16, capacitor 38 and resistor 36 during the "coasting" state. In some applications, a charge on the capacitor 38 at the end of the "coasting" state may still be present at the beginning of the "on" state and thus would result in an undesired increase in pulse width.

The pendulum structure illustrated in FIG. 9 differs from the pendulum construction illustrated in my prior U.S. Pat. No. 3,783,550 in providing two degrees of freedom of oscillation. This is afforded by suspending the upper end of the pendulum arm 76 by a wire loop 78 supported by a second wire loop 80 secured to a cap piece 82 at the upper end of an inclined post 84. The lower end of the post is secured to the top base 86 of a hollow housing. The bottom side of the hollow housing is removably closed by a bottom wall 14, as in the previous embodiments.

The pendulum arm 76 hangs freely downward by gravity and supports at its bottom end a bob 88 which mounts a permanent magnet 90. The magnet is arranged to swing in close proximity to the top base 86 of the hollow housing. Within the hollow housing is contained the induction coil 16 and the associated electric circuit 18.

The operation of the circuit of FIG. 2 with the pendulum structure of FIG. 9 is the same as with the spinning top 20 of FIG. 1 described hereinbefore, it being necessary merely to replace the words "spinning top" with the words "moving pendulum". In the case of the pendulum, the circuit is in the "off" state while the pendulum bob 88 is away from the coil 16.

Let it now be assumed that the pendulum bob has been put into motion. As the bob is approaching and is sufficiently near the coil, the circuit will turn "on". This results in pulling the pendulum bob toward the coil and increasing the energy of the bob. The circuit will be in the "on" state or "coasting" state so long as the bob continues approaching the coil. The bob also receives energy from the coil while the circuit is in the "coasting" state. After the bob passes over the coil, the circuit goes to the "off" state.

Of course, the circuit also works if the polarity of the coil or of the magnet is reversed. In such case, the circuit is in the "off" state while the bob approaches the coil and switches to the "on" state after the bob begins moving away from the coil. This results in pushing the bob away and increasing the energy of the bob.

In the case of a 6-inch pendulum operating with a 9 volt battery, experience has found that for optimum performance the RC time constant should be chosen so that the circuit changes from the "on" state to the "coasting" state and back to the "on" state from 10 to 30 times each time the pendulum magnet passes across the coil. For different size pendulums and different battery voltages, the optimum RC time constant can change greatly. For larger pendulums and/or less battery voltage a greater RC time constant should be chosen, which results in fewer state changes, as from "on" to "coasting", each time the pendulum magnet passes across the coil.

The potentiometer circuit of FIG. 4 may be used with the pendulum structure of FIG. 9 to afford adjustment of the pendulum motion between "perky" and "sluggish" actions. The circuit of FIG. 6 responds to less input voltage from the coil, as previously mentioned, thereby allowing its use with slow moving pendulums. The circuit of FIG. 7 can pass higher current to the coil, whereby it can be used with large size pendulums which require relatively high power. The circuit of FIG. 8 assures consistent pulse width and therefore when used with the pendulum structure of FIG. 9 the pendulum receives more consistent power and this consequently results in a more consistent level of action or movement of the bob 88.

Means is provided for inducing the pendulum arm to swing in an unpredictable, random motion afforded by the wire loop supports 78 and 80. This is achieved in accordance with this invention by providing a pattern of permanent repelling magnets in a symmetrical pattern about the vertical axis of the coil 16 to effect perturbing the motion of the pendulum magnet 90 in such a manner that it will appear to move in a random fashion. For this purpose it has been found that the arrangement of such perturbing magnets must be an odd number of three or more in order that the space between adjacent magnets be diametrically opposite one of the permanent perturbing magnets. It is by this means that the pendulum is not allowed to find a "straight" path across the coil 16. If the pendulum can find such a straight path, it will stay in it and thus have a boring type of oscillatory action.

To illustrate the foregoing, FIG. 10 shows an arrangement of three perturbing magnets 92 disposed in a symmetrical pattern about the axis of the coil 16. It is to be noted that a straight line extended from any one of the magnets through the axis of coil 16 does not intercept another magnet. The same is true of the arrangement shown in FIG. 11 wherein seven perturbing magnets 92 are arranged symmetrically about the axis of the coil 16.

FIG. 12 illustrates an arrangement of five perturbing magnets 92 arranged in a symmetrical pattern about the axis of the coil 16. It also shows a sixth perturbing magnet 94 positioned radially inward of the other magnets. It also is a repelling magnet and its purpose is to perturb the pendulum as it begins to spiral around the coil, in the manner depicted by the line 96.

In this regard, it is a rare circumstance that the pendulum may begin to spiral around the coil 16. Since the coil may be triggered on only if the pendulum moves in a direction that is at least somewhat toward or somewhat away from the coil, the coil cannot trigger on if the pendulum moves in a direction that is substantially perpendicular to the direction that is toward the coil. Thus, if the pendulum spirals around the coil, the coil will not trigger on and the pendulum ultimately will stop. The "anti-spiral" magnet 94 functions to perturb the pendulum as it begins to spiral around the coil and thus interrupt the spiraling motion.

FIG. 13 shows an arrangement of five pairs of repelling magnets 98 arranged symmetrically about the axis of the coil 16. The line 100 depicts a motion of the pendulum which might result if the housing base 86 is not level. Thus, whereas an arrangement of five single symmetrically arranged magnets might allow the pendulum to swing diametrically to opposite sides of but slightly off center from the axis of the coil 16, the illustrated arrangement of five pairs of perturbing magnets serves to interrupt such a pendulum motion and causes the latter to swing away from the diametric line.

The magnet configuration shown in FIG. 14 includes five symmetrically arranged repelling magnets 92 and five symmetrically arranged attracting magnets 102 each disposed between an adjacent pair of the repelling magnets 92. The arrangement is one solution to the problem of selecting perturbing magnets of optimum magnetic field strength in the mass production of large numbers of novelty electric motors of this invention. For an explanation, reference is made to FIGS. 15, 16, and 17.

FIG. 15 illustrates schematically an arrangement of five repelling perturbing magnets 92 disposed symmetrically about the axis of the coil 16. It also illustrates the strength of the magnetic field along the line segment ABC and a perpendicular line segment DBE, with the two line segments intersecting at the point B at a height h above the magnets.

FIG. 16 shows graphs of the magnetic field strength (MFS) along the line segment ABC, and FIG. 17 shows graphs of the magnetic field strength along the line segment DBE. The angular force, or torque on the pendulum magnet 90 is proportional to the strength of the magnetic field in which it is placed. But the linear force on the pendulum magnet is proportional to the magnetic field gradient, i.e. the rate of change along the line segment. Since the angular force on the pendulum plays only a minor role in the action of the pendulum, only the linear force is considered here.

Thus, it is the slopes of the curves in FIGS. 16 and 17 that are of interest. In this regard, the dotted curves correspond to perturbing magnets 92 that are stronger than optimum and the continuous curves correspond to pertubing magnets that are weaker than optimum. An ideal magnetic field would have a high gradient along the line segment ABC and a low gradient along the line segment DBE. A high gradient along line segment ABC is desirable so that the pendulum is sufficiently perturbed to break out of any rut that it might get into, while a low gradient along the line segment DBE is desirable so that the pendulum can pass between the magnets.

Nearly ideal curves are the dash curves shown in FIGS. 16 and 17, and these curves correspond to the magnet configuration shown in FIG. 14. In this arrangement the attracting magnets 102 increase the gradient along the line segment ABC and yet decrease the gradient along the line segment DBE. Thus, strong repelling magnets 92 can be used for a high gradient along line segment ABC, with the addition of the small attracting magnets 102 to keep the gradient along the line segment DBE from becoming too high.

From the foregoing it will be apparent to those skilled in the art that various changes may be made in the size, shape, number, type and arrangement of parts described hereinbefore without departing from the spirit of this invention and the scope of the appended claims.

Having now described my invention and the manner in which it may be used, I claim:

1. A novelty electric motor, comprising
    (a) a stationary stator coil having an electric circuit,
    (b) a magnet armature,
    (c) means supporting the magnet armature in spaced proximity to the coil for movement relative to the coil,
    (d) a source of electric potential in the electric circuit of the coil,
    (e) switch means in said electric circuit operable by coil current induced by movement of the magnet armature for releasably connecting the source of electric potential across the coil momentarily to impose a magnetic field on the magnet armature to accelerate the movement thereof, and
    (f) an RC time constant circuit connected across the coil for establishing the duration of time the source of electric potential is connected across the coil.

2. The novelty electric motor of claim 1 wherein the resistance component of the RC time constant circuit is a variable resistor for varying the magnitude of the time constant.

3. The novelty electric motor of claim 1 wherein the switch means comprises a transistor the emitter-collector circuit of which is connected in series with the coil across the source of electric potential and the base-emitter circuit of which is connected in series with the emitter-collector circuit of a second transistor across the source of electric potential, the base-emitter circuit of the second transistor being connected in series with a resistor across the source of electric potential.

4. The novelty electric motor of claim 3 including a third transistor the emitter-collector circuit of which is connected across the base-emitter circuit of the second transistor and the base-emitter circuit of which third transistor is connected across the capacitance component of the RC time constant circuit.

5. The novelty electric motor of claim 3 including biasing means in the base-emitter circuit of the second transistor and connected in series with the coil across the source of electric potential.

6. The novelty electric motor of claim 5 wherein the biasing means comprises a biasing diode.

7. The novelty electric motor of claim 5 wherein the biasing means comprises a biasing transistor in the base-emitter circuit of the second transistor, the emitter-collector circuit and the base-emitter circuit of the biasing transistor being connected in series with the coil across the source of electric potential.

8. The novelty electric motor of claim 3 including the series arrangement of a resistance and a diode connecting the emitter-collector circuit of the first transistor and the base-emitter circuit of the second transistor in series across the source of electric potential.

9. The novelty electric motor of claim 1 including a diode connected across the resistance component of the RC circuit and forming with the capacitance component of the RC circuit a current loop through the coil.

10. The novelty electric motor of claim 1 including a diode connected across the coil and forming a current loop therewith.

11. The novelty electric motor of claim 1 including a diode connected in series with the RC circuit across the coil.

12. The novelty electric motor of claim 1 wherein
  (a) the switch means comprises a transistor the emitter-collector circuit of which is connected in series with the coil across the source of electric potential and the base-emitter circuit of which is connected in series with the emitter-collector circuit of a second transistor across the source of electric potential, the base-emitter circuit of the second transistor being connected in series with a resistor across the source of electric potential.
  (b) a third transistor the emitter-collector circuit of which is connected across the base-emitter circuit of the second transistor and the base-emitter circuit of which third transistor is connected across the capacitance component of the RC time constant circuit,
  (c) biasing means in the base-emitter circuit of the second transistor and connected in series with the coil across the source of electric potential,
  (d) a diode connected across the resistance component of the RC circuit and forming with the capacitance component of the RC circuit a current loop through the coil, and
  (e) a diode connected across the coil and forming a current loop therewith.

13. The novelty electric motor of claim 12 wherein
  (a) the magnet armature is a permanent magnet and the supporting means therefor comprises a pendulum arm supported at its upper end for swinging movement and supporting the magnet at its lower end for reciprocative movement relative to the coil, and
  (b) an odd number of three or more permanent perturbing magnets are arranged at symmetrically spaced positions around the axis of the coil and poled for repelling the magnet supported by the pendulum arm.

14. The novelty electric motor of claim 13 including an additional repelling permanent magnet positioned inwardly of the perturbing magnets for preventing the pendulum magnet from spiraling around the axis of the coil.

15. The novelty electric motor of claim 13 including a permanent attracting magnet disposed between each adjacent pair of perturbing magnets.

16. The novelty electric motor of claim 13 wherein an odd number of three or more pairs of permanent perturbing magnets are arranged at symmetrically spaced positions around the axis of the coil and poled for repelling the magnet supported by the pendulum arm.

17. The novelty electric motor of claim 1 wherein the magnet armature is a permanent magnet spinning top and the supporting means therefor comprises a base arranged to support the magnet for rotation in spaced proximity to the coil.

18. The novelty electric motor of claim 1 wherein the magnet armature is a rotary shaft supporting a plurality of radially extending permanent magnets spaced apart circumferentially about the shaft and the supporting means therefore comprises a base arranged to support the magnets for rotation in spaced proximity to the coil.

19. The novelty electric motor of claim 1 wherein the stator coil has a hollow core and the magnet armature is a permanent magnet mounted for reciprocative movement on the axis of said hollow core.

20. The novelty electric motor of claim 19 wherein the reciprocative mounting for the magnet is a resiliently extensible member.

21. The novelty electric motor of claim 19 wherein the reciprocative mounting for the magnet is a coil spring.

22. The novelty electric motor of claim 1 wherein the magnet armature is a permanent magnet and the supporting means therefor comprises a pendulum arm supported at its upper end for swinging movement and supporting the magnet at its lower end for reciprocative movement relative to the coil.

23. The novelty electric motor of claim 22 wherein the pendulum arm is supported for two degrees of freedom of movement, and an odd number of three or more permanent perturbing magnets are arranged at symmetrically spaced positions around the axis of the coil and poled for repelling the magnet supported by the pendulum arm.

24. The novelty electric motor of claim 23 including an additional repelling permanent magnet positioned inwardly of the perturbing magnets for preventing the pendulum magnet from spiraling around the axis of the coil.

25. The novelty electric motor of claim 23 including a permanent attracting magnet disposed between each adjacent pair of perturbing magnets.

26. The novelty electric motor of claim 22 wherein the pendulum arm is supported for two degrees of freedom of movement, and an odd number of three or more pairs of permanent perturbing magnets are arranged in symmetrically spaced positions around the axis of the coil and poled for repelling the magnets supported by the pendulum arm.

27. A novelty electric motor, comprising
(a) a stationary stator coil having an electric circuit,
(b) a permanent magnet armature,
(c) a pendulum arm supported at its upper end for swinging movement with two degrees of freedom and supporting the magnet armature at its lower end for reciprocative movement relative to the coil,
(d) a source of electric potential in the electric circuit of the coil,
(e) switch means in said electric circuit operable by coil current induced by movement of the magnet armature for releasably connecting the source of electric potential across the coil momentarily to impose a magnetic field on the magnet armature to accelerate the movement thereof, and
(f) an odd number of three or more permanent perturbing magnets arranged at symmetrically spaced positions around the axis of the coil and poled for repelling the magnet supporting by the pendulum arm.

28. The novelty electric motor of claim 27 including an additional repelling permanent magnet positioned inwardly of the perturbing magnets for preventing the pendulum magnet from spiraling around the axis of the coil.

29. The novelty electric motor of claim 27 including a permanent attracting magnet disposed between each adjacent pair of perturbing magnets.

30. The novelty electric motor of claim 27 wherein an odd number of three or more pairs of permanent perturbing magnets are arranged at symmetrically spaced positions around the axis of the coil and poled for repelling the magnet supported by the pendulum arm.

* * * * *

UNITED STATES PATENT AND TRADEMARK OFFICE
CERTIFICATE OF CORRECTION

PATENT NO. : 4,728,871

DATED : 1 March 1988

INVENTOR(S) : Roger W. Andrews

It is certified that error appears in the above-identified patent and that said Letters Patent are hereby corrected as shown below:

Column 4, line 34, after the period (.), insert -- Otherwise the circuit will remain in the "off" state. --.

Signed and Sealed this

Twenty-third Day of August, 1988

Attest:

DONALD J. QUIGG

*Attesting Officer*  Commissioner of Patents and Trademarks